United States Patent
Hasegawa et al.

[11] Patent Number: 6,150,044
[45] Date of Patent: Nov. 21, 2000

[54] MAGNETIC HEAD

[75] Inventors: Hiroyuki Hasegawa, Katano; Ken Takahashi, Osaka; Akihiro Ashida, Nara; Eisuke Sawai; Hiromi Takeda, both of Kyoto, all of Japan

[73] Assignee: Matsushita Electric Industrial Co., Ltd., Osaka, Japan

[21] Appl. No.: 08/233,259

[22] Filed: Apr. 26, 1994

[30] Foreign Application Priority Data

Apr. 27, 1993 [JP] Japan ............................ 5-100940

[51] Int. Cl.$^7$ .................................................. G11B 5/255
[52] U.S. Cl. .......................... 428/692; 428/693; 428/900; 360/120
[58] Field of Search ..................... 428/692, 693, 428/900, 433; 360/110, 119, 120, 121, 122, 125, 126, 127

[56] References Cited

U.S. PATENT DOCUMENTS

| | | | |
|---|---|---|---|
| 3,458,926 | 8/1969 | Maissel et al. | 29/603 |
| 4,048,714 | 9/1977 | Huntt | 29/603 |
| 4,170,032 | 10/1979 | Yokoyama et al. | 360/120 |
| 4,475,137 | 10/1984 | Yasuda et al. | 360/126 |
| 4,948,667 | 8/1990 | Mikami et al. | 428/336 |
| 5,001,590 | 3/1991 | Saito et al. | 360/120 |
| 5,034,273 | 7/1991 | Sakakima et al. | 428/336 |
| 5,155,645 | 10/1992 | Shimizu et al. | 360/126 |

FOREIGN PATENT DOCUMENTS

| | | |
|---|---|---|
| 3934284 | 4/1990 | Germany . |
| 59-107416 | 7/1984 | Japan . |
| 59-146431 | 8/1984 | Japan . |
| 1-276410 | 11/1989 | Japan . |

OTHER PUBLICATIONS

J.F. Dundovic, "Magnetic–Head Relapping Techniques", Project Notes/Engineering Briefs, Journal of the Audio Engineering Society, vol. 24, No. 8, May 1976, New York, pp. 656–659.

*Primary Examiner*—Stevan A. Resan
*Attorney, Agent, or Firm*—McDermott, Will & Emery

[57] ABSTRACT

In a metal-in-gap magnetic head, a pair of magnetic core halves made of ferrite are arranged to oppose to each other, and metallic magnetic films are applied to each of opposing surfaces of the pair of magnetic core halves. A hard glass layer and a chromium layer are applied to a gap plane of the magnetic head as a gap layer. A gap is formed so as to abut on the chromium layers between a pair of the gap layers. The hard glass layer includes borosilicate as a main component and it has Vickers hardness of the same as that of said metallic magnetic films or less and softening temperature of 550° C. or higher. Thus, a magnetic head does not generate a spacing loss when a tape slides thereon.

4 Claims, 5 Drawing Sheets

Fig. 3 COMPARISON EXAMPLE

MAGNETIC HEAD

BACKGROUND OF THE INVENTION

1. Field of the Invention

The present invention relates to a magnetic head used for a magnetic recording apparatus such as a video cassette recorder, a digital audio tape recorder, a floppy disk drive or a hard disk drive for recording and reproducing information at a high density for a magnetic recording medium.

2. Description of the Prior Art

Previously, a magnetic head made from a ferrite is used for a magnetic recording apparatus such as a video cassette recorder. However, in order to record and reproduce information at a higher density, it is needed to increase the coercive force (hereinafter referred to as $H_c$) of a recording medium, and a metal tape of $H_c$ of 80 kA/m or higher is used to increase coercive force. In order to avoid magnetic saturation, a magnetic head is developed to have a part of a magnetic core made of a metallic soft magnetic material such as a Sendust alloy, a cobalt based super-structured alloy or an iron-based nitride alloy having a high saturation magnetic flux density (hereinafter referred to as $B_s$) and a high magnetic permeability.

In a prior art metal-in-gap (MIG) head (U.S. Pat. No. 5,001,590), a pair of metallic magnetic films of high $B_s$ are formed on opposing planes of magnetic cores made of ferrite to form a gap between them. Then, $SiO_2$ layers and barrier layers are formed successively to cover each of the metallic magnetic films as a main-gap layer. Then, the gap is adhered by fusing an adhesive glass between the opposing barrier layers abutted on each other. (As disclosed in Japanese Patent laid open Publication No. 276410/1989, a chromium layer as the barrier layer is preferable for suppressing the reaction between the metallic magnetic films and $SiO_2$.) When a magnetic tape slides on such a magnetic head having $SiO_2$ as a main gap material, the metallic magnetic films are abrased selectively on sliding planes and a space is generated eventually between the magnetic tape and the magnetic gap. Then, the output signals of the magnetic head decreases due to a spacing loss caused by the selective abrasing.

SUMMARY OF THE INVENTION

An object of the present invention is to provide a magnetic head which can provide a stable interface with a magnetic tape when the magnetic tape slides thereon.

In a magnetic head according to the present invention, a metallic magnetic film is applied to each of opposing planes of a pair of magnetic core halves made of ferrite arranged to oppose each other. A glass layer including a borosilicate as a main component and a chromium layer are applied successively to each of the surfaces of the metallic magnetic films, to form a gap layer. An adhesive layer is formed between the chromium layers abutted to each other to adhere them. Preferably, the glass layer has Vickers hardness equal to that of the metallic magnetic layers or less and softening temperature of 550° C. or higher.

Preferably, the metallic magnetic film is made of an amorphous or microcrystalline nitride alloy wherein amorphous or microcrystalline alloy layers and nitride layers are layered alternately or a composition of at least nitrogen is modulated in the direction of film thickness. An average composition of the amorphous nitride alloy or the microcrystalline nitride alloy is expressed with a general formula $T_aM_bN_c$, wherein T denotes an Fe alloy, a Co alloy or an FeCo alloy, M denotes a composite including at least one element among Nb, Ta, Zr, Hf, Ti, Mo, W, Cr, Mn, Re and Ru, and atomic ratios a, b and c satisfy following relations:

$0.70 \leq a \leq 0.95$,
$0.05 \leq b \leq 0.30$,
$0.015 \leq c \leq 0.20$,
and
$a+b+c=1.0$.

An advantage of the present invention is that a selective abrasion on a sliding plane on which a magnetic tape slides can be suppressed.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
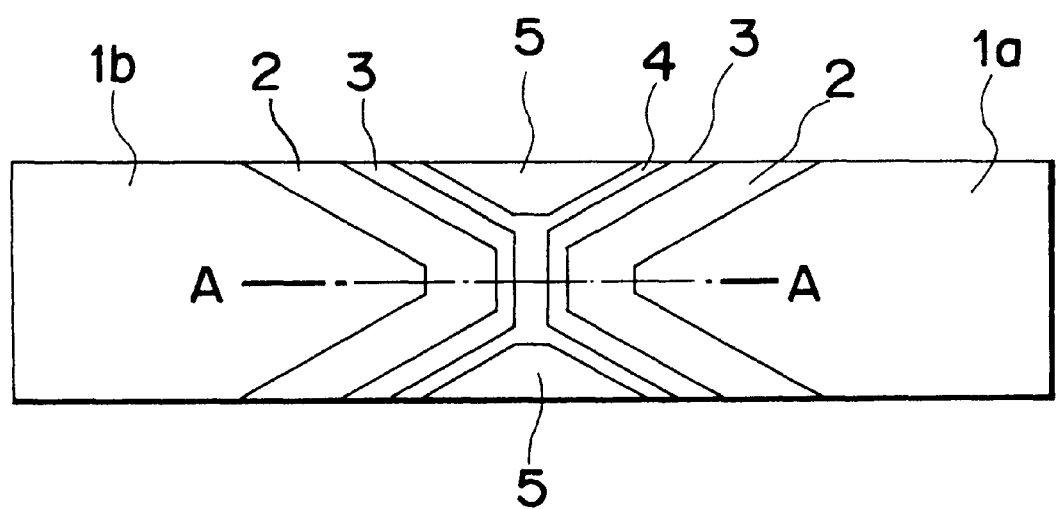
FIG. 1 is a plan view of a sliding plane of a magnetic head of an embodiment of the present invention.

Referring now to the drawings, wherein like reference characters designate like or corresponding parts throughout the several views, FIG. 1 shows an embodiment of a metal-in-gap magnetic head viewed from a sliding plane thereof on which a magnetic tape 20 (not shown) slides. A pair of magnetic core halves 1a and 1b for constructing a main magnetic circuit is made of ferrite as an oxide magnetic material and are to be separated from each other to form a gap. A metallic magnetic film 2 having a saturation magnetic flux $B_s$ and a magnetic permeability both higher than ferrite and having a high crystalization temperature is formed with sputtering, deposition or the like on each of planes of the magnetic core halves 1a, 1b opposing to each other. The metallic magnetic film 2 of the present embodiment is made of a cobalt based super-structured nitride alloy, or it consists of a nitride alloy film with modulated composition of 3 $\mu$m of thickness wherein CoNbZr and CoNbZrN of 20 nm thickness are layered alternately. A glass layer 3 as a main-gap material having a borosilicate as a main component and having a high softening temperature covers the surface of the metallic magnetic film 2 completely. The composition of a glass material used for the glass layer 3 is as follows: $SiO_2$ 80.6%, $B_2O_3$ 11.9%, $Al_2O_3$ 2.0%, a sum of CaO, MgO and $As_2O3$ 1.1% and $Na_2O$ 4.4%. Chromium layers 4 are formed on the surfaces of the glass layers 3 so as to cover the glass layers 3 completely. The glass layer 3 prevents elements in the metallic magnetic film 2 from scattering into the chromium layer 4 to generate a layer deteriorated magnetically on the surface of the metallic magnetic layer 2. The glass layers 3 and the chromium layers 4 form a gap layer between the metallic magnetic films 2. Then, adhesive glass layer 5 is applied to surfaces of the chromium layers 4 abutted on each other to adhere them, as shown in FIG. 1. The adhesive glass layer 5 is made of a low melting point glass. The chromium layer 4 suppresses a reaction between the glass layer 3 and the adhesive glass layer 5. It also improves wettability of the adhesive glass layer 5 and suppresses generation of foams when the adhesive glass layer 5 fill the space.

Figure 2:
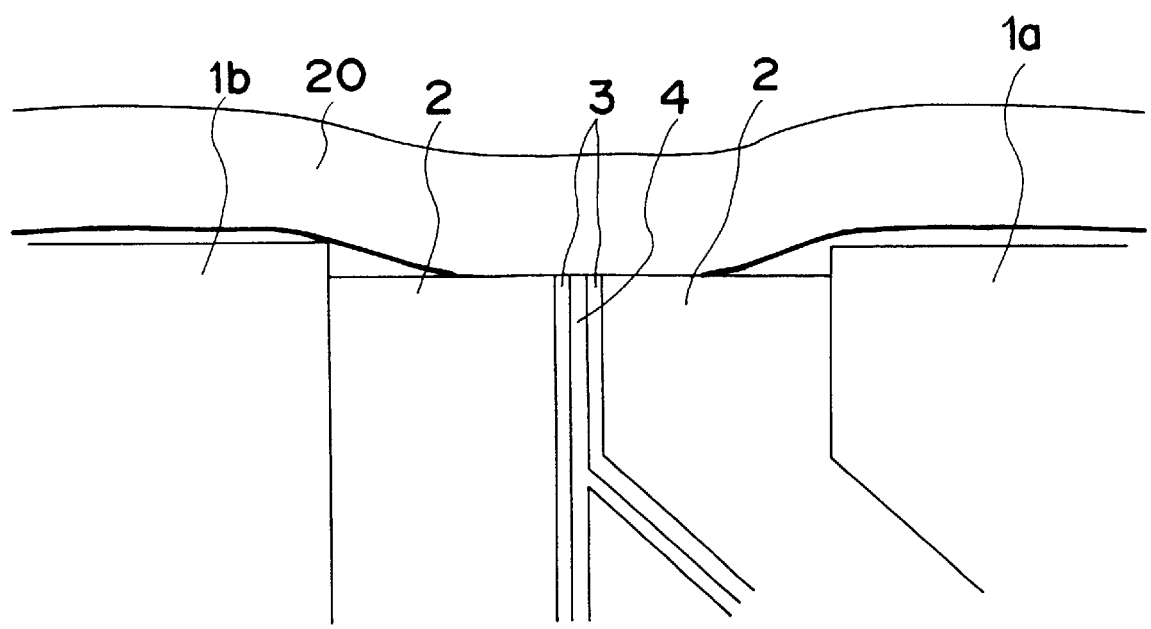
FIG. 2 is a sectional view of the magnetic head of the present embodiment and a magnetic tape.

FIG. 2 shows a section of the magnetic head along a line A—A in FIG. 1 when a magnetic tape 20 slides thereon. In the magnetic head, the glass layers 3 having borosilicate as a main component and of Vickers hardness of 650 kg/cm$^2$ or less is used as a main gap material. The Vickers hardness of the metallic magnetic films 2 is 650 kg/mm$^2$ or less. Therefore, the Vickers hardness of the metallic magnetic films 2 is about same as that of the glass layer 3. When the magnetic tape 20 slides on the magnetic head, the metallic magnetic film 2 and the glass layers 3 are abrased at about a same rate, and no step called as selective abrasion is generated at boundaries between the glass layers 3 and the metallic magnetic films 2. Thus, the magnetic tape 20 can run stably, and a spacing loss is very small. Then, electromagnetic conversion characteristic of the magnetic head remains very excellent.

Figure 3:
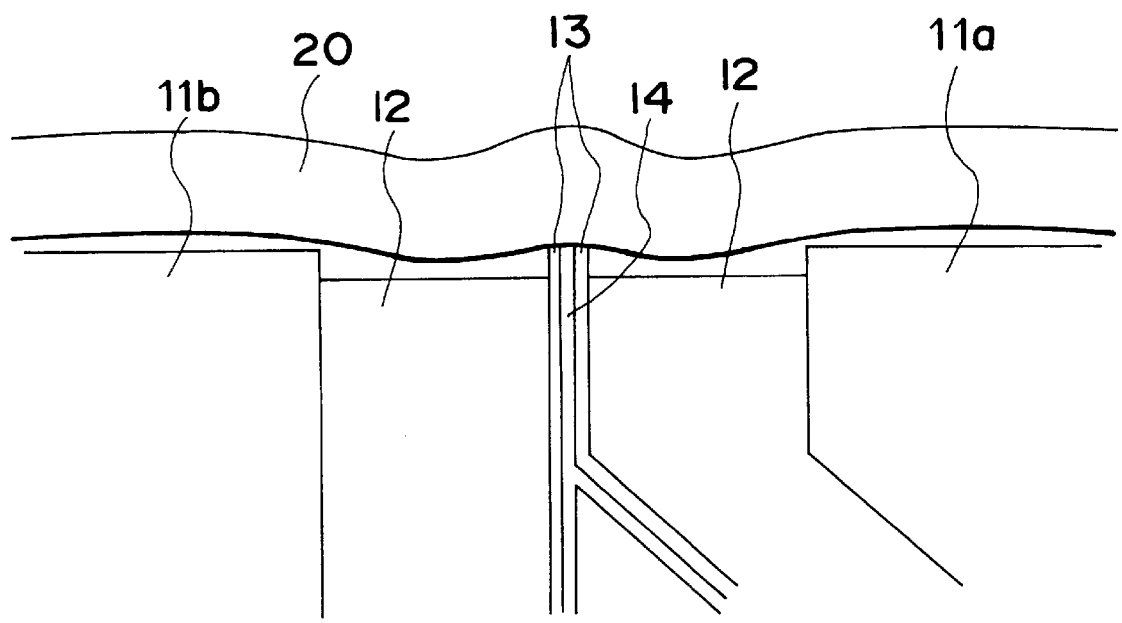
FIG. 3 is a sectional view of the prior art magnetic head and a magnetic tape.

FIG. 3 shows a comparison example which is different from that of the present embodiment in a point that SiO$_2$ is used for the glass layer 3 instead of a glass material having a borosilicate as a main component. In the comparison magnetic head, the Vickers hardness of SiO$_2$ of 720 kg/mm$^2$ is higher than about 700 kg/mm$^2$ of ferrite of the magnetic core halves and 650 kg/mm$^2$ or less of the metallic magnetic films. Then, the metallic magnetic films which are the softest are selectively worn. Therefore, a step called as selective abrasion is generated between the SiO$_2$ layers and the metallic magnetic films, and a space is generated eventually due to the abrasion between the magnetic gap and the magnetic tape.

Figure 4:
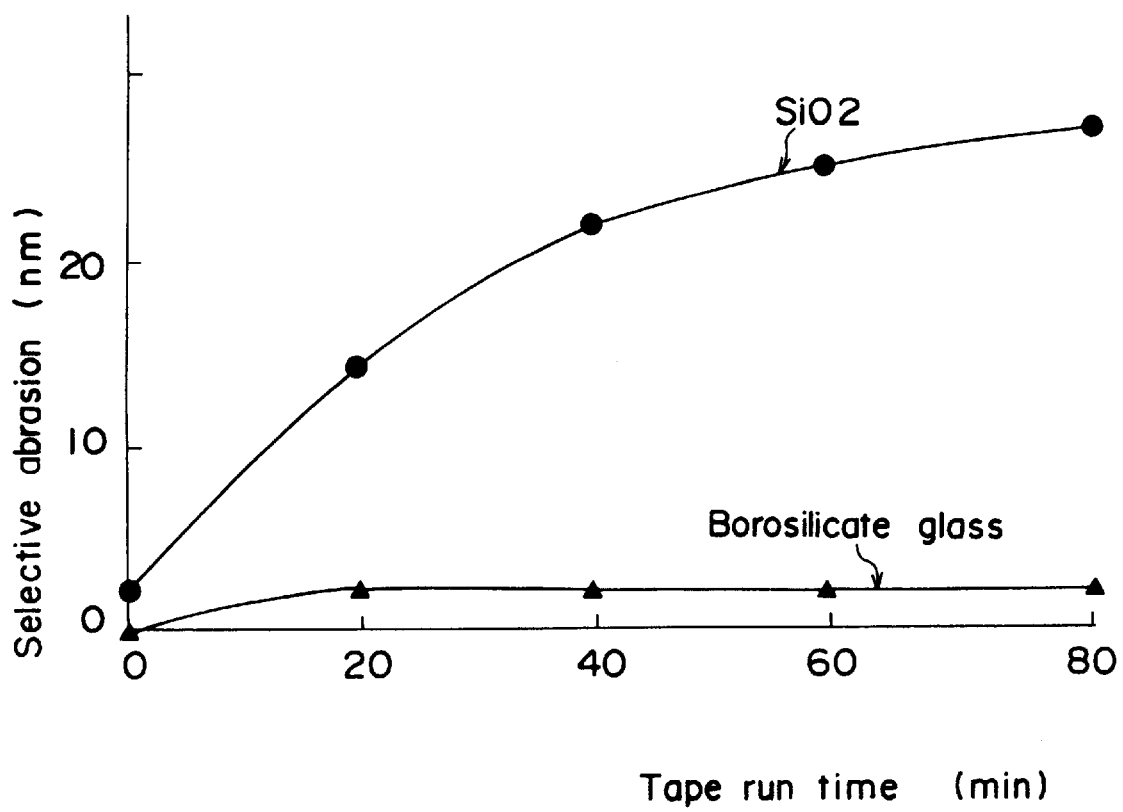
FIG. 4 is a graph of time dependence of a step at a magnetic gap portion of the magnetic head of the present embodiment and of the prior art magnetic head.

FIG. 4 shows time dependence of selective abrasion at a surface of a magnetic gap portion of the magnetic head of the present embodiment and of the comparison example of a magnetic head. As explained above, the selective abrasion of the comparison magnetic head increases up to about 30 nm at maximum as a magnetic tape slides thereon. On the contrary, the selective abrasion of the magnetic head of the present embodiment remains 5 nm or less stably, and a very good tape-and-head interface can be realized.

Figure 5:
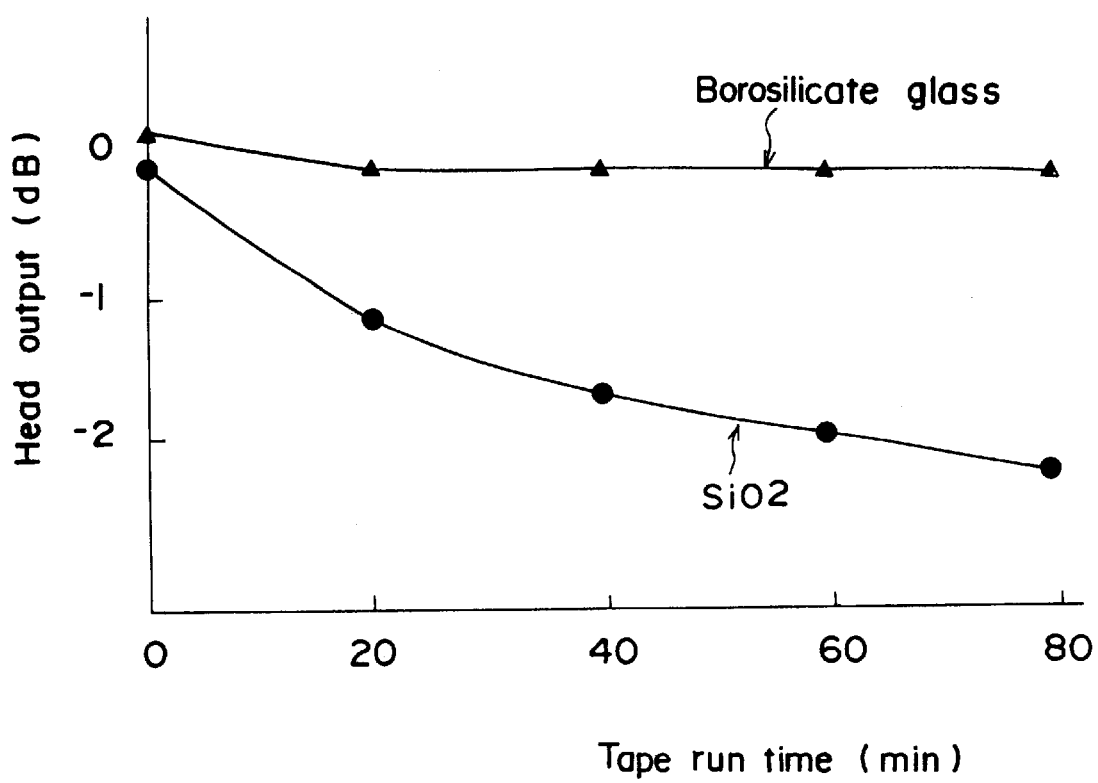
FIG. 5 is a graph of time dependence of output signals of the magnetic head of the present embodiment and of the prior art magnetic head.

FIG. 5 shows time dependence of output signals of the magnetic head of the present embodiment and of the comparison magnetic head. As guessed readily from the results shown in FIG. 4, in the comparison magnetic head, selective abrasion is increased as a magnetic tape 20 is run, so that a spacing loss increases as shown in FIG. 3 and the electromagnetic conversion characteristic is deteriorated. On the other hand, in the magnetic head according to the present embodiment, because the abrasion is small, the electromagnetic conversion characteristic remains very good.

It is desirable that the glass layers 3 includes a borosilicate as a main component which has Vickers hardness of 650 kg/mm$^2$ or less and softening temperature of 550° C. or higher. A glass material which satisfies this condition is limited. This condition is explained below.

Though SiO$^2$ is used previously for the glass layer 3, it has large Vickers hardness of about 720 kg/mm$^2$. On the other hand, the metallic magnetic films 2 has Vickers hardness of 650 kg/mm$_2$ or less. In order to decrease a step at a boundary between the metallic magnetic film 2 and the glass layer 3 or to decrease selective abrasion at the glass layer 3, it is needed that a glass has Vickers hardness of about the same as that of the metallic magnetic films 2 or less. Then, in the present embodiment, a glass including borosilicate as a main component is selected for the glass layers 3 because the Vickers hardness of the glass layer 3 is 650 kg/mm$^2$ or less, about equal to 650 kg/mm$^2$ of the metallic magnetic films 2 and less than about 690 kg/mm$^2$ of ferrite of the magnetic core halves 1a, 1b. Therefore, a step or a selective abrasion due to abrasion generated by a run of a magnetic tape is small. Then, a stable tape-and-head interface can be realized, and the deterioration of the electromagnetic conversion characteristic due to a spacing loss is small.

Further, as mentioned above, the glass material having a high softening temperature is needed for the glass layers 3. Because of the high softening temperature of the glass layers 3 of 550° C. or higher, a reaction between the metallic magnetic film 2 and the hard glass layer 3 can be suppressed. Further, the chromium layers 4 plays a role to suppress that the glass layers 3 and the adhesive glass layer 5 are melted to react with the metallic magnetic film 2 when the adhesive glass layer 5 fills the gap. Therefore, deterioration of the properties of the magnetic head can be suppressed.

The composition of the metallic magnetic film 2 is not limited to the above-mentioned one. The metallic magnetic films 2 are needed to have a high saturation magnetic flux density and a high magnetic permeability. In order to satisfy this condition, preferably the metallic magnetic films 2 have a composition described below. That is, the metallic magnetic film 2 is made of an amorphous or microcrystalline nitride alloy, wherein amorphous or microcrystalline alloy layers and nitride layers are layered alternately or a composition of at least nitrogen is modulated in the direction of film thickness. An average composition of the amorphous nitride alloy or the microcrystalline nitride alloy is expressed with a general formula $T_a M_b N_c$, wherein T denotes an Fe alloy, a Co alloy or an FeCo alloy, M denotes a composite including at least one element among Nb, Ta, Zr, Hf, Ti, Mo, W, Cr, Mn, Re and Ru, and atomic ratios a, b and c satisfy following relations:

$0.70 \leq a \leq 0.95$, $0.05 \leq b \leq 0.30$, $0.015 \leq c \leq 0.20$, and $a+b+c=1.0$.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic head comprising:

a pair of magnetic core halves made of ferrite and arranged to oppose to each other, metallic magnetic films being applied to each of opposing surfaces of the pair of magnetic core halves;

a pair of gap layers each comprising a glass layer having a borosilicate as a main component and a chromium layer, which glass layer and chromium layer being applied successively to each of the opposing surfaces of the metallic magnetic films, which chromium layers being abutted to each other; and an adhesive layer applied between the chromium layers to adhere them.

2. The magnetic head according to claim 1, wherein said metallic magnetic film is made of an amorphous or microcrystalline nitride alloy wherein amorphous or microcrystalline alloy layers and nitride layers are layered alternately or a composition of at least nitrogen is modulated in the direction of film thickness, an average composition of the amorphous nitride alloy or the microcrystalline nitride alloy being expressed with a general formula $T_aM_bN_c$, wherein T denotes an Fe alloy, a Co alloy or an FeCo alloy, M denotes a composite including at least one element among Nb, Ta, Zr, Hf, Ti, Mo, W, Cr, Mn, Re and Ru, and atomic ratios a, b and c satisfy following relations:

$0.70 \leq a \leq 0.95$,
$0.05 \leq b \leq 0.30$,
$0.015 \leq c \leq 0.20$,
and
$a+b+c=1.0$.

3. The magnetic head according to claim 1, wherein said glass layer including borosilicate as a main component has Vickers hardness of the same as that of said metallic magnetic films or less and softening temperature of 550° C. or higher.

4. The magnetic head according to claim 2, wherein said glass layer including borosilicate as a main component has Vickers hardness of the same as that of said metallic magnetic films or less and softening temperature of 550° C. or higher.

* * * * *